United States Patent
Brause et al.

(10) Patent No.: US 7,597,833 B1
(45) Date of Patent: Oct. 6, 2009

(54) FIXTURELESS MANUFACTURE OF BONDED ACTUATOR/COIL ASSEMBLIES

(75) Inventors: David D. Brause, Longmont, CO (US); Todd M. Morton, Longmont, CO (US); Tave J. Fruge, Louisville, CO (US)

(73) Assignee: Maxtor Corporation, Scotts Valley, CA (US)

( * ) Notice: Subject to any disclaimer, the term of this patent is extended or adjusted under 35 U.S.C. 154(b) by 238 days.

(21) Appl. No.: 10/791,150

(22) Filed: Mar. 2, 2004

Related U.S. Application Data

(60) Provisional application No. 60/452,623, filed on Mar. 6, 2003.

(51) Int. Cl.
*B32B 37/00* (2006.01)
*B29C 45/14* (2006.01)
*B29C 65/00* (2006.01)
*B28B 5/02* (2006.01)
*G11B 21/08* (2006.01)
*G11B 5/127* (2006.01)

(52) U.S. Cl. .............. 264/261; 264/255; 264/259; 264/271.1; 264/272.11; 264/294; 29/602.1; 29/603.03; 29/603.23; 29/603.25; 29/606; 360/265.8; 156/182; 156/290; 156/291; 156/305; 156/322

(58) Field of Classification Search .............. 360/265.8
See application file for complete search history.

(56) References Cited

U.S. PATENT DOCUMENTS

| | | | |
|---|---|---|---|
| 5,168,185 A * | 12/1992 | Umehara et al. .............. 310/15 |
| 5,623,759 A | 4/1997 | Thorson et al. .......... 29/603.04 |
| 5,650,896 A * | 7/1997 | Viskochil .................. 360/265.7 |
| 5,734,528 A * | 3/1998 | Jabbari et al. ................ 360/265 |
| 6,061,206 A * | 5/2000 | Foisy et al. ............... 360/265.7 |
| 6,229,675 B1 * | 5/2001 | Tanaka et al. ................ 360/265 |
| 6,289,577 B1 * | 9/2001 | Tanaka et al. ............. 29/603.03 |
| 6,480,364 B1 * | 11/2002 | Thanomsat et al. ....... 360/265.7 |
| 6,555,043 B2 * | 4/2003 | Angellotti .................... 264/263 |
| 6,867,950 B1 * | 3/2005 | Lin .......................... 360/265.8 |
| 7,042,681 B1 * | 5/2006 | Fruge et al. .............. 360/265.8 |
| 7,161,769 B1 * | 1/2007 | Chang et al. ............. 360/265.9 |
| 2001/0042941 A1 * | 11/2001 | Angellotti .............. 264/272.14 |
| 2003/0081355 A1 * | 5/2003 | Arisaka et al. .............. 360/265 |

* cited by examiner

Primary Examiner—Jeffrey Wollschlager
(74) Attorney, Agent, or Firm—Fellers, Snider, et al.

(57) ABSTRACT

An actuator/coil assembly (136) is disclosed where two different bonding operations are used. First, a bobbin (164) is overmolded to a coil (172), and a first overmolded part (176) is overmolded to both the coil (172) and a fan tail (152) of the actuator (140). The overmolding operation defines one or more adhesive receptacles (168) in the bobbin (164) on a perimeter that interfaces with the coil (172), and further defines one or more adhesive receptacles (180) in the first overmolded part (176) on a perimeter that interfaces with the coil (172) and that interfaces with the fan tail (152) of the actuator (140). Adhesive (184) is disposed within these receptacles (168, 180) to increase the stiffness of the actuator/coil assembly (136).

35 Claims, 9 Drawing Sheets

FIXTURELESS MANUFACTURE OF BONDED ACTUATOR/COIL ASSEMBLIES

CROSS REFERENCE TO RELATED APPLICATIONS

This patent application claims priority under 35 U.S.C. 119(e) to U.S. Provisional Application No. 60/452,623, that is entitled "Fixtureless Method for Manufacture of Bonded Actuator Coil Assemblies," that was filed on Mar. 6, 2003, and the entire disclosure of which is incorporated by reference in its entirety herein.

FIELD OF THE INVENTION

The present invention generally relates to actuator/coil assemblies for data storage devices such as disk drives and, more particularly, to attaching a voice coil motor coil to an actuator first using an overmolding operation and thereafter supplementing the attachment with an adhesive.

BACKGROUND OF THE INVENTION

Conventional data storage disk drives typically include a base plate and cover that is detachably connected to the base plate to define an enclosure for various disk drive components. One or more data storage disks are generally mounted on a spindle that is rotatably interconnected with the base plate and/or cover so as to allow the data storage disk(s) to rotate relative to the base plate and cover via a spindle motor. An actuator (e.g., a single actuator arm, a plurality of individual actuator arms, one or more actuator arms extending from an actuator body, an E-block with one or more actuator arm tips), is interconnected with the base plate and/or cover by an appropriate bearing or bearing assembly so as to enable the actuator to move about an axis relative to both the base plate and the cover in a controlled manner. A load beam or suspension extends from each actuator arm or actuator arm tip. A head gimbal assembly is attached to each suspension and includes one or more transducers, such as in the form of a read/write head, for purposes of exchanging signals with its corresponding data storage disk.

The position of the actuator, and thereby each transducer, is typically controlled via a voice coil motor or the like, which moves the actuator to dispose the transducer(s) to a desired radial position relative to the corresponding data storage disk (e.g., into alignment with the relevant track formed on the corresponding data storage disk). Voice coil motors are a type of rotary actuator, and typically utilize a coil that is mounted on and moves along with the actuator, as well as a pair of stationery magnets that are disposed above and below this coil.

In operation, the voice coil motor moves the actuator as the data storage disk(s) rotate via the spindle motor. Rotational speeds of data storage disks used by disk drives continue to increase. Access times to data stored on the data storage disks is at least partially a function of the rotational speed of the data storage disk(s). Furthermore, access times are also dependent upon vibrations within the actuator. Such vibrations can include resonant frequencies within the actuator that may result in relatively high amplitude vibrations. Accordingly, such vibrations can degrade the performance of the disk drive. In this regard, it is desirable to reduce/eliminate potential sources of vibration in high speed data storage devices.

One source of potential vibration is found in the voice coil motor. Of particular interest is the interconnection of the coil to the actuator. These coils are oftentimes interconnected to the actuator utilizing an overmolding process. In this process, both the actuator and the coil are disposed within a mold, at which time an appropriate resin (e.g., a plastic/polymer) is injected into the mold. This injected resin forms an overmolded structure that interconnects the coil to the actuator, while also electrically isolating the coil from the actuator. Overmolding processes are often preferred as they provide an economical way to interconnect the coil to the actuator. However, overmold resins are subject to shrinkage as they cool, which makes it difficult to obtain a solid, intimate bond between the coil and the actuator. This tends to lower the overall stiffness of the interconnection between the actuator and the coil, which can lead to the introduction of vibrations into the system during disk drive operations.

An alternative method of attaching a coil to an actuator is to utilize a curable adhesive, such as an epoxy. Such adhesives typically exhibit little or no shrinkage as they cure, thereby obtaining a better bond between the coil and actuator. Accordingly, actuators that utilize adhesively-bonded coils may exhibit a greater overall stiffness and a reduced susceptibility to vibration. However, the curing time for such adhesives may be significantly greater than that of an overmolding process. In addition, the production of the actuator having an adhesively bonded coil requires an individual fixture to hold the actuator and coil in the desired relative position during the adhesive bonding process. Utilization of such individual fixtures, coupled with potentially long curing periods, increases the manufacturing cost of the actuator/coil assembly. Curing time reductions may be realized by utilizing a UV curable adhesive (i.e., thermally cured and UV cured). However, UV curable adhesives oftentimes exhibit decreased stiffness at the elevated temperatures that are encountered during normal disk drive operations. In addition, such adhesives tend to outgas chemicals at temperatures encountered within the drive, and these gases may adversely affect one or more disk drive components and/or disk drive operations.

SUMMARY

Various embodiments of the present invention are generally directed to the fixtureless manufacture of bonded actuator/coil assemblies.

In accordance with some embodiments, a method generally comprises steps of overmolding a coil to an actuator to attach said coil to said actuator via an intervening overmold material, and then disposing an adhesive in at least one adhesive receptacle defined in the overmold material so that the adhesive contactingly engages the coil and the actuator.

In accordance with other embodiments, a method generally comprises steps of employing an initial overmolding operation to attach a voice motor coil to a bobbin via an overmolding material while forming an adhesive receptacle in said material; and subsequently filling the adhesive receptacle with an adhesive to further attach said bobbin to said coil, wherein the adhesive contactingly engages the coil and the bobbin.

DETAILED DESCRIPTION OF THE INVENTION

Figure 1:
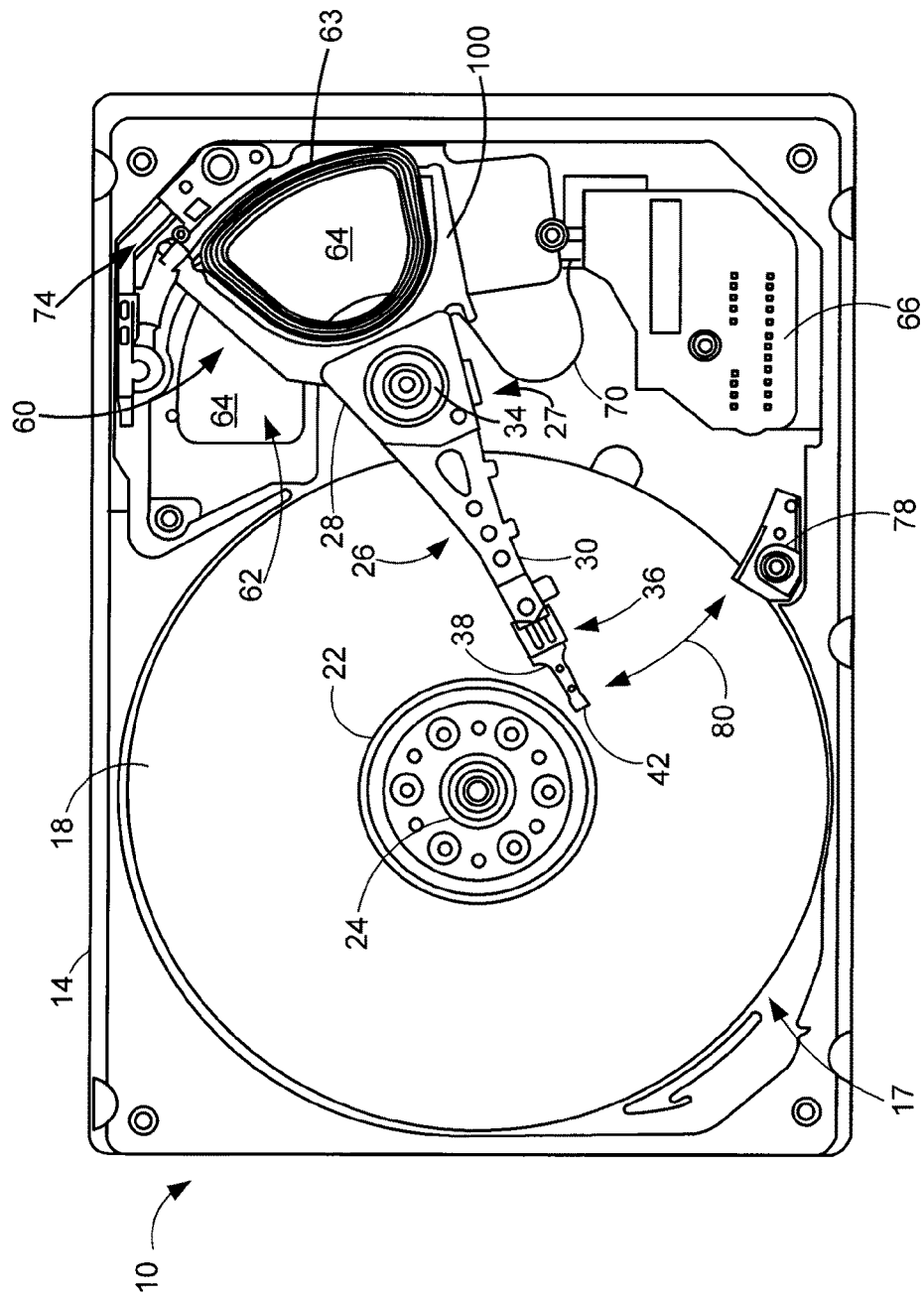
FIG. 1 is a top or plan view of one embodiment of a disk drive.
Figure 2:
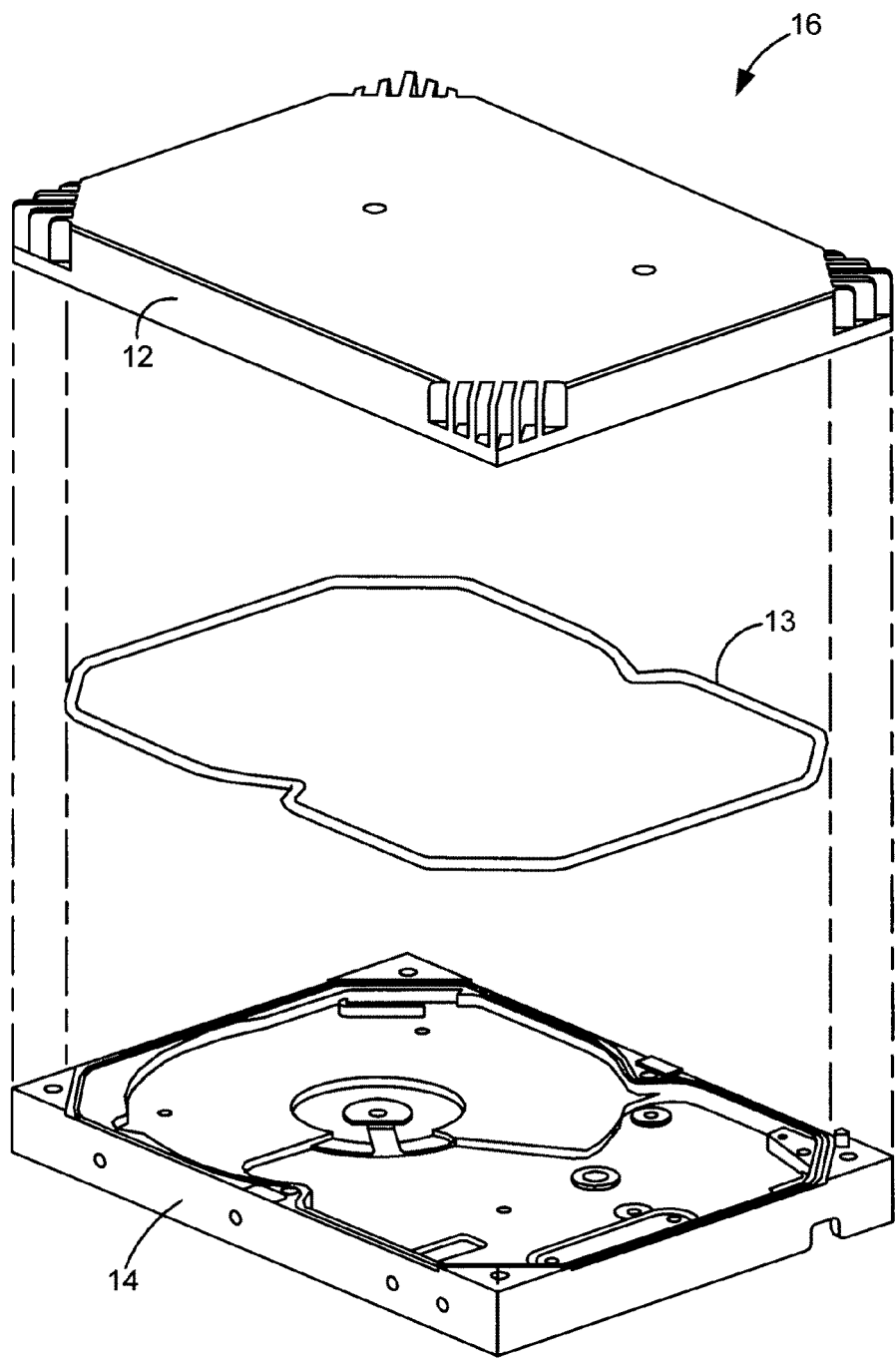
FIG. 2 is an exploded, perspective view of one embodiment of a disk drive housing that may be utilized by the disk drive of FIG. 1.

The present invention will now be described in relation to the accompanying drawings that at least assist in illustrating its various pertinent features. One embodiment of a disk drive 10 is illustrated in FIGS. 1-4. The disk drive 10 generally includes a disk drive housing 16 of any appropriate configuration that defines an enclosed space for the various disk drive components. Here the housing 16 includes a base plate 14 that is typically detachably interconnected with a cover 12. A suitable gasket 13 may be disposed between the cover 12 and the base plate 14 to enhance the seal therebetween.

The disk drive 10 includes one or more data storage disks 18 of any appropriate computer-readable data storage media. Typically both of the major surfaces of each data storage disk 18 include a plurality of concentrically disposed tracks for data storage purposes. Each disk 18 is mounted on a hub or spindle 22, which in turn is rotatably interconnected with the disk drive base plate 14 and/or cover 12. Multiple data storage disks 18 would be mounted in vertically spaced and parallel relation on the spindle 22 and may be characterized as a hard disk assembly or HDA 17. Rotation of the disk(s) 18 is provided by a spindle motor 24 that is appropriately coupled to the spindle 22 to simultaneously spin the data storage disk(s) 18 at an appropriate rate.

The disk drive 10 also includes head stack assembly or HSA 26, that in turn includes an actuator 27. The actuator 27 is in the form of an actuator body 28 having one or more individual rigid actuator arms 30 extending therefrom. This actuator body 28 is mounted on a pivot bearing 34. Each actuator arm 30 pivots about the pivot bearing 34, which in turn is rotatably supported by the base plate 14 and/or cover 12. Multiple actuator arms 30 would be disposed in vertically spaced relation, with one actuator arm 30 typically being provided for each major data storage surface of each data storage disk 18 of the disk drive 10. Other actuator configurations could be utilized as well, such as an "E" block having one or more rigid actuator arm tips or the like that cantilever from a common structure, or one or more individual actuator arms that are each mounted on the pivot bearing 34.

Movement of the actuator 27 is provided by an appropriate head stack assembly drive, such as a voice coil motor 62 or the like. The voice coil motor 62 may be characterized as a rotary drive. The voice coil motor 62 is a magnetic assembly that controls the movement of the actuator 27 under the direction of control electronics 66. Typical components of the voice coil motor 62 are a coil 63 that is mounted on the actuator 27 (and that defines an actuator/coil assembly 60), and a separate magnet 64 that is disposed above and below this coil 63 (the upper magnet not being shown in FIG. 1). The magnets 64 will typically be mounted on the housing 16. Any appropriate head stack assembly drive type may be utilized by the disk drive 10, including a linear drive (for the case where the actuator 27 is interconnected with the base plate 14 and/or cover 12 for linear movement versus the illustrated pivoting movement about the pivot bearing 34), as well as other types of rotational/pivoting drives.

A head-gimbal assembly or HGA 36 is interconnected with each actuator arm 30 and includes a load beam or suspension 38 that is attached to the free end of each actuator arm 30 or actuator arm tip, and cantilevers therefrom. All HGAs 36 are part of the HSA 26. Typically the suspension 38 of each HGA 36 is biased at least generally toward its corresponding disk 18 by a spring-like force. A slider 42 is disposed at or near the free end of each suspension 38. What is commonly referred to in the art as the "head" 44 (e.g., at least one transducer) is appropriately mounted on the slider 42 and is used in disk drive read/write operations. Various types of read/write technologies may be utilized by the head 44 on the slider 42. In any case, the biasing forces exerted by the suspension 38 on its corresponding slider 42 thereby attempt to move the slider 42 in the direction of its corresponding disk 18. Typically this biasing force is such that if the slider 42 were positioned over its corresponding disk 18, without the disk 18 being rotated at a sufficient velocity, the slider 42 would be in contact with the disk 18.

Each head 44 is interconnected with the control electronics 66 of the disk drive 10 by a flex cable 70 that is typically mounted on the actuator arm assembly 26. Signals are exchanged between the head 44 on the slider 42 and its corresponding data storage disk 18 for disk drive read and/or write operations. In this regard, the voice coil motor 62 pivots the actuator arm(s) 30 to simultaneously move each head 44 on its slider 42 along a path 80 and "across" the corresponding data storage disk 18 to position the head 44 at the desired/required radial position on the disk 18 (i.e., at the correct track on the data storage disk 18) for disk drive read/write operations.

When the disk drive 10 is not in operation, the actuator 27 is pivoted to a "parked position" to dispose each slider 42 in a desired position relative to its corresponding data storage disk 18. The "parked position" may be at least generally at or more typically beyond a perimeter of its corresponding data storage disk 18 or at a more interior location of the corresponding disk 18, but in any case typically in vertically spaced relation to its corresponding disk 18. This is commonly referred to in the art as being a dynamic load/unload disk drive configuration. In this regard, the disk drive 10 includes a ramp assembly 78 that is disposed beyond a perimeter of the data storage disk 18 in the illustrated configuration to typically both move the corresponding slider 42 vertically away from its corresponding data storage disk 18 and to also exert somewhat of a retaining force on the corresponding actuator arm 30. Any configuration for the ramp assembly 78 that provides the desired "parking" function may be utilized. The disk drive 10 could also be configured to be of the contact start/stop type, where each actuator arm 30 would pivot in a direction to dispose the slider(s) 42 typically toward an inner, non-data storage region of the corresponding data storage disk 18. Terminating the rotation of the data storage disk(s) 18 in this type of disk drive configuration would then result in the slider(s) 42 actually establishing contact with or "landing" on their corresponding data storage disk 18, and the slider 42 would remain on the disk 18 until disk drive operations are re-initiated. In either configuration, it may be desirable to at least attempt to retain the actuator arm(s) 30 in this parked position if the disk drive 10 is exposed to a shock event. In this regard, the disk drive 10 includes an actuator arm assembly latch 74 that moves from a non-latching position to a latching position to engage an actuator arm 30 so as to preclude the same from pivoting in a direction which would tend to drag the slider(s) 42 across its corresponding data storage disk 18.

Figure 3:
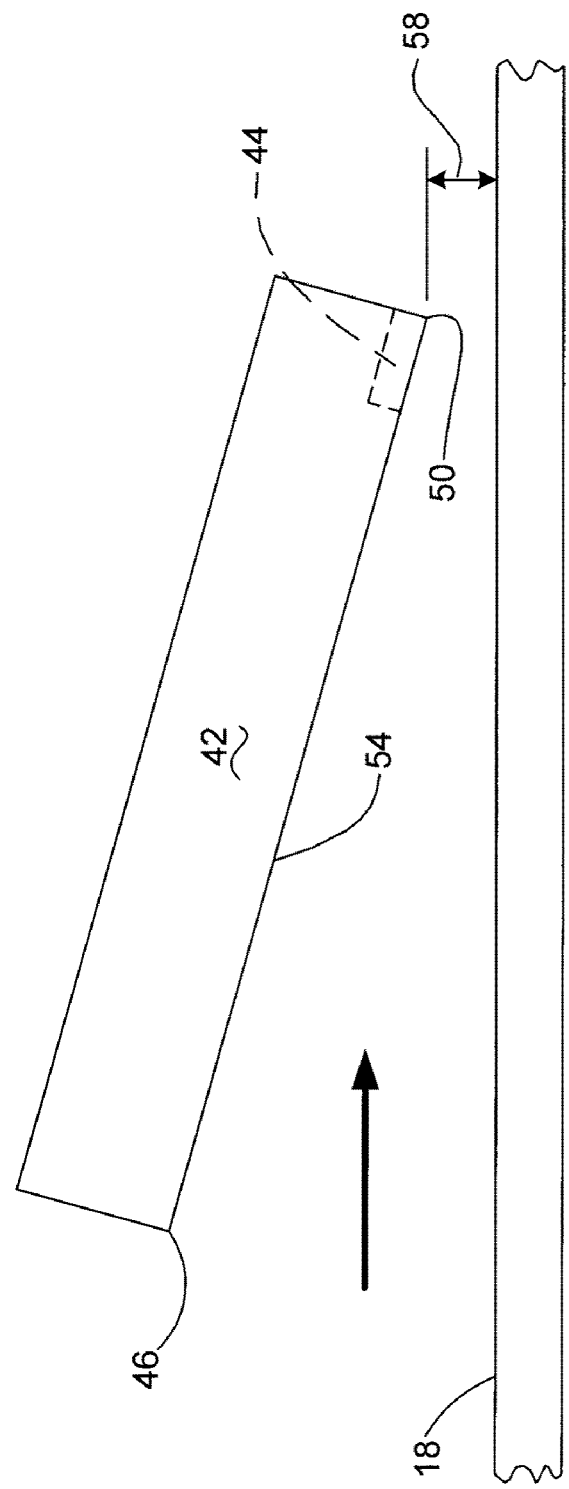
FIG. 3 is a side view of one embodiment of a flying-type slider that may be used by the disk drive of FIG. 1.

The slider 42 of the disk drive 10 may be configured to "fly" on an air bearing during rotation of its corresponding data storage 18 at a sufficient velocity. This is schematically illustrated in FIG. 3 where a lower surface 54 of the slider 42 would include an appropriate air-bearing-surface (ABS) system (not shown). Here the direction of the rotation of the disk 18 relative to the slider 42 is represented by the arrow, while the fly height of the slider 42 is represented by reference numeral 58 (measured from a reference plane of the mean of the surface roughness of the disk 18). In FIG. 3, the slider 42 is disposed at a pitch angle such that its leading edge 46 of the slider 42 is disposed further from its corresponding data storage disk 18 than its trailing edge 50. The transducer(s) 44 would typically be incorporated on the slider 42 at least generally toward its trailing edge 50 since this is positioned closest to its corresponding disk 18. Other pitch angles could be utilized for flying the slider 42. The disk drive 10 could also be configured for contact or near-contact recording (not shown).

Figure 4:
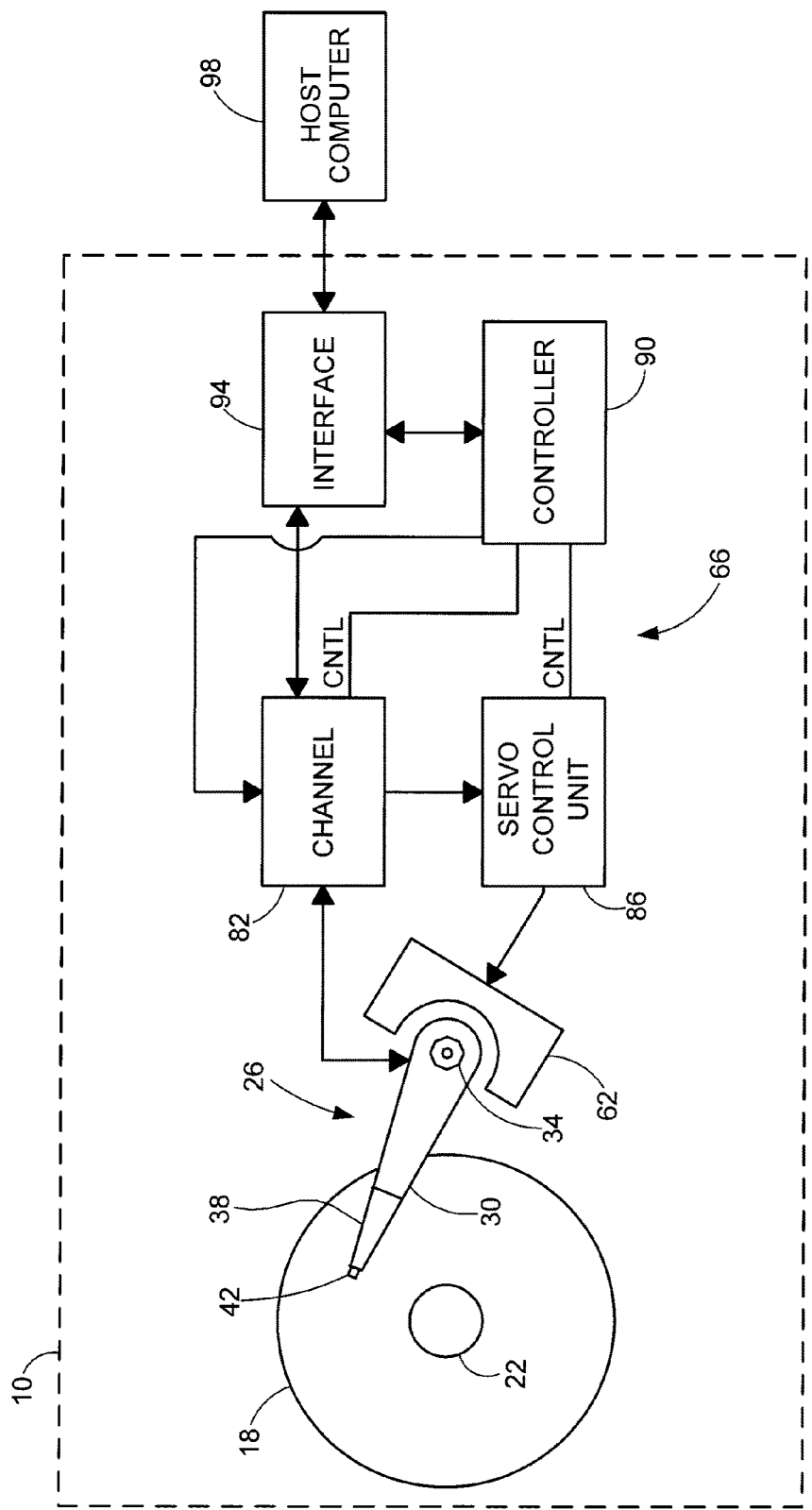
FIG. 4 is a simplified electrical component block diagram of the disk drive of FIG. 1.

FIG. 4 illustrates a simplified electrical component block diagram of the disk drive 10 of FIG. 1. The control electronics 66 in this case includes a controller 90 and a servo control unit 86. The disk drive 10 in FIG. 4 also includes a channel 82, as well as an interface 94 for interconnecting the disk drive 10 with a host computer 98. During operation of the disk drive 10, the data storage disk 18 rotates. Data is stored on the data storage disk 18 in substantially concentric tracks. Data may be read from or written to the data storage disk 18 by moving the slider 42 and its head 44 to the desired track and performing the desired communication operation (i.e., a read or write operation). In one embodiment, the data storage disk 18 includes a magnetic media having concentric read/write tracks and the head 44 includes at least one transducer that is capable of communicating with this magnetic data storage disk 18.

The voice coil motor 62 receives servo control information from the servo control unit 86 to cause the voice coil motor 62 to move each actuator arm 30 and its corresponding head 44 when repositioning of the head(s) 44 is desired/required. In this regard, the head(s) 44 may periodically read positioning information from the surface of the corresponding data storage disk 18 and transmit the positioning information to the servo control unit 86 via the channel 82. The servo control unit 86 compares the present position of the head(s) 44 to a desired position, with movement of the actuator arm(s) 30 being made as required for proper track alignment.

The channel 82 receives a number of inputs for processing so that data may be manipulated by the devices internal and external, such as the host computer 98, which is again interconnected with the disk drive 10 via the interface 94. One operation of the channel 82 is to receive an analog signal from the head(s) 44 and to convert the analog signal to a digital signal recognized by the host computer 98. In addition, the channel 82 facilitates the storage of information from the host computer 98 to the data storage disk(s) 18 by encoding data signals from the host computer 98 and creating a write signal, from the encoding data, which is transmitted to the head(s) 44 for storage on the corresponding data storage disk 18.

The controller 90 controls the timing and operation of other elements of the disk drive 10. The controller 90 receives input/output requests from the host computer 98 via the interface 94. Based on the input to the controller 90, the controller 90 delivers appropriate commands to the servo control unit 86 and the channel 82. For example, in a read operation, the controller 90 commands the servo control unit 86 to move the head(s) 44 to the desired track on the corresponding data storage disk 18 such that the data written on the disk 18 may be transferred to the host computer 98. Accordingly, the servo control unit 86 moves the head(s) 44 to the desired track on the corresponding data storage disk 18 using the servo positioning information read from the data storage disk 18 by the corresponding head 44. In turn, the head(s) 44 reads the information from the corresponding data storage disk 18 and transmits information to the channel 82 that converts the information so that it may be interpreted by the host computer 98.

A continuing trend in the disk drive industry is the increased storage capacity of the data storage disks 18. In this regard, the density of the concentrically disposed tracks on the data storage disks 18 continues to increase as manufacturing methods allow. In order to allow timely access to information stored on the increasingly dense data storage disks 18, the head stack assembly 26 is likewise operated at continually increasing speeds. That is, the rotary drive voice coil motor 62, along with the coil 63, moves the head stack assembly 26 back and forth (e.g., periodically) at ever higher speeds to read data information from the data storage disks 18. As will be appreciated, in response to periodic motion, bodies will exhibit a vibration characteristic when the period of motion matches the first harmonic frequency (or a multiple of the first harmonic frequency) of that body. In this regard, as the frequency with which the head stack assembly 26 is moved back and forth approaches or matches its first harmonic frequency (i.e., also known as the principle mode) or, a multiple thereof, a vibration may result in the head stack assembly 26. These vibrations may interfere with reading/writing information from the data storage disks 18 and thereby reduce disk drive efficiency or otherwise adversely affect disk drive operations.

A determination has been made that increasing the overall stiffness of the actuator/coil assembly 60 of the head stack assembly 26 increases the principle mode frequency. Enhancing the stiffness of the actuator/coil assembly 60 increases the frequency bandwidth range (i.e., from zero to the principle mode frequency), allowing for operations at increased speeds prior to the generation of harmonic vibrations. One way to increase the overall stiffness of the actuator/coil assembly 60 is in relation to the interconnection of the coil 63 with the actuator 27.

Figure 5:
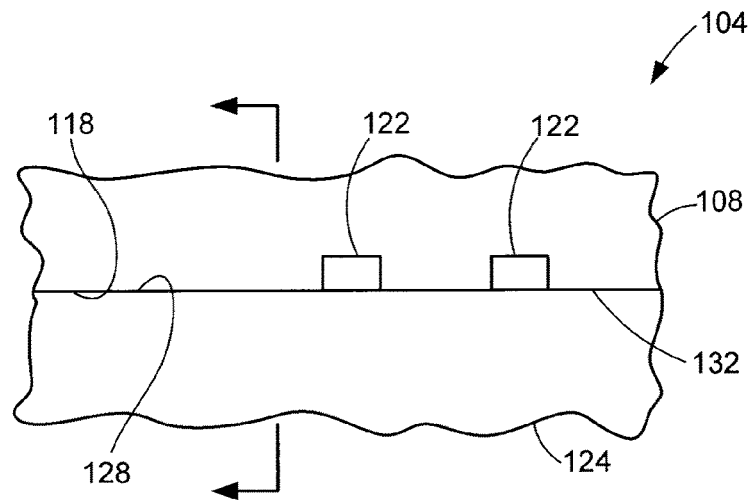
FIG. 5 is a schematic of an overmolded part that is attached to another component of an actuator/coil assembly by an overmolding operation, and further by disposing an adhesive in one or more adhesive receptacles that are defined by the overmolding operation.

FIG. 5 schematically illustrates one way to increase the stiffness of an actuator/coil assembly for a disk drive, namely to strengthen the interconnection between two adjoining and attached components of the actuator/coil assembly by using at least two separate and distinct bonding or attachment techniques or steps. It should be appreciated that the principles of the actuator/coil assembly 104 that are illustrated in relation to FIG. 5 may be incorporated in the actuator/coil assembly 60 of the disk drive of FIG. 1, as well as any other actuator/coil assembly for a disk drive.

Figure 5A:
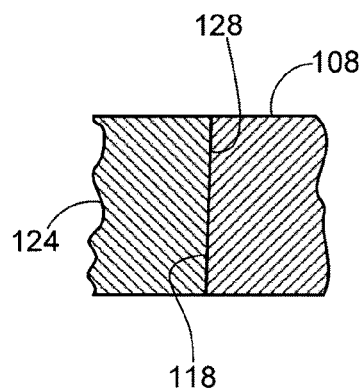
FIGS. 5A and 5B illustrate alternative joints between the overmolded part and the component of FIG. 5.
Figure 5B:
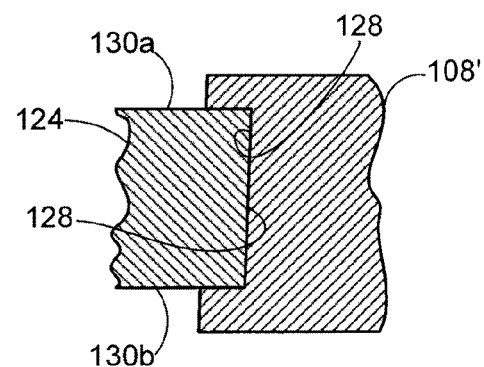

The actuator/coil assembly 104 of FIG. 5 includes a first actuator/coil assembly part 108 (e.g., a bobbin, a structure disposed between and interconnecting a voice coil motor coil and the actuator) and a second actuator/coil assembly part 124 (e.g., a coil, an actuator). The first actuator/coil assembly part 108 is formed by an overmolding operation. It would then be proper to refer to the first actuator/coil assembly part 108 as a first overmolded part or as an overmolded first actuator/coil assembly part 108. In any case, the overmolding operation also attaches the overmolded first actuator/coil assembly part 108 to the second actuator/coil assembly part 124. That is, at least a perimeter surface 118 of the overmolded first actuator/coil assembly part 108 adjoins or abuts a perimeter surface 128 of the second actuator/coil assembly part to define a joint 132 between the first actuator/coil assembly part 108 and the second actuator/coil assembly part 124. The overmolded first actuator/coil assembly part 108 and the second actuator/coil assembly part 124 could be configured to define a simple butt joint as illustrated in FIG. 5A, or the overmolded first actuator/coil assembly part 108' could be configured to capture an edge portion of one or both of the major surfaces 130a, 130b of the second actuator/coil assembly 124 as illustrated in FIG. 5B. In any case, those portions of the overmolded first actuator coil assembly part 108 that interface with the second actuator/coil assembly part 124 become attached by the overmolding operation.

The attachment of the overmolded first actuator/coil assembly part 108 to the second actuator/coil assembly part 124 through the overmolding operation itself provides a first stiffness for the interconnection between these two parts. The stiffness of this interconnection is increased by forming one or more adhesive receptacles 122 on the perimeter surface 118 of the first actuator/coil assembly part 108 in the case of the actuator/coil assembly 104. Each such adhesive receptacle 122 is preferably directly formed by the overmolding operation, which again not only forms the first actuator/coil assembly part 108, but which also attaches the first actuator/coil assembly part 108 to the second actuator/coil assembly part 124. Disposing an appropriate adhesive in any such adhesive receptacle 122 should increase the stiffness of the interconnection between the first actuator/coil assembly part 108 and the second actuator/coil assembly part 124. At least certain adhesives may wick into any space that adjoins is an adhesive receptacle 122 and that exists between the overmolded first actuator/coil assembly part 108 and the second actuator/coil assembly part 124.

One advantage of using both overmolding and adhesive attachment techniques is increasing the stiffness of the interconnection between the overmolded first actuator/coil assembly part 108 and the second actuator/coil assembly part 124. Another advantage of the configuration/techniques embodied by the actuator/coil assembly 104 of FIG. 5 is its effect on the overall process for assembling a disk drive that utilizes the principles of the actuator/coil assembly 104. It should be appreciated that since the first actuator/coil assembly part 108 and the second actuator/coil assembly part 124 are attached by the overmolding process, and since the adhesive is not deposited in the adhesive receptacle(s) until after completion of the overmolding operation, no fixtures should be needed for applying the adhesive. That is, the overmolding operation itself maintains the overmolded first actuator/coil assembly part 108 in a fixed, predetermined position relative to the second actuator/coil assembly part 124 for application of an appropriate adhesive.

Figure 6A:
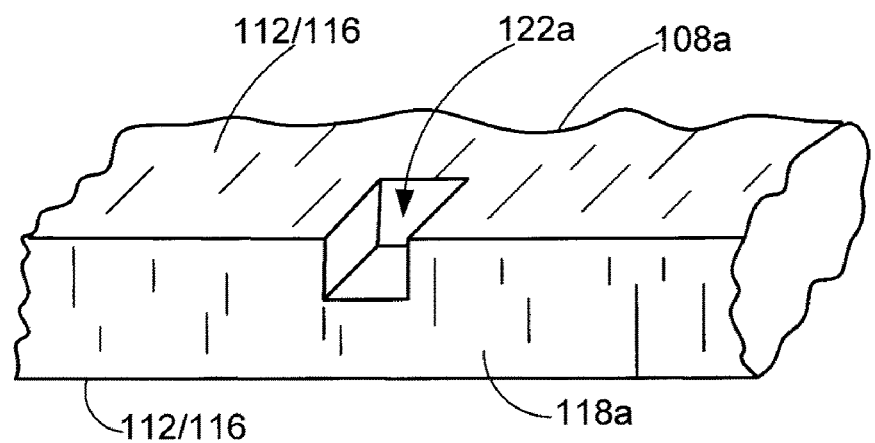
FIGS. 6A-F illustrate various embodiments of adhesive receptacles on a perimeter of an overmolded part for attachment to another component of an actuator/coil assembly by both the overmolding operation and a subsequent application of adhesive in the adhesive receptacle(s).
Figure 6B:
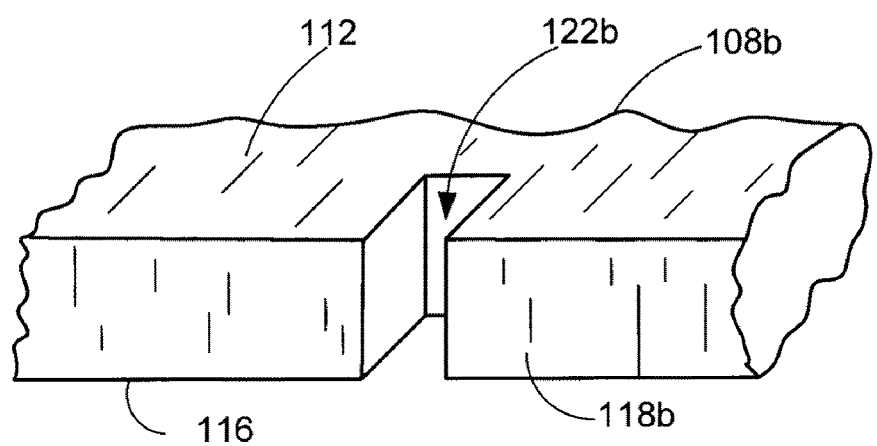

Any configuration/size/shape/type of adhesive receptacle 122 may be used by the actuator/coil assembly 104 for enhancing the stiffness of the interconnection between the overmolded first actuator/coil assembly part 108 and the second actuator/coil assembly part 124. Moreover, any appropriate number of adhesive receptacles 122 may be used, and in any appropriate arrangement and/or relative position. FIGS. 6A-F illustrate a representative number of options in this regard. FIG. 6A shows that that one or more adhesive receptacle 122a may be formed to intersect with both the perimeter surface 118a of an overmolded first actuator/coil assembly part 108a, and either its first major surface 112 (e.g., a top surface) or its second major surface 116 (e.g., its bottom surface). The depth of each adhesive receptacle 122a is less than the distance between the first major surface 112 and the second major surface 116 (e.g., less than the thickness of the overmolded first actuator/coil assembly part 108). FIG. 6B shows that one or more adhesive receptacles 122b may intersect with the perimeter surface 118b of an overmolded first actuator/coil assembly part 108b, and may extend the entire distance between the first major surface 112 (e.g., its top surface) and the second major surface 116 (e.g., its bottom surface) of the part 108b.

Figure 6C:
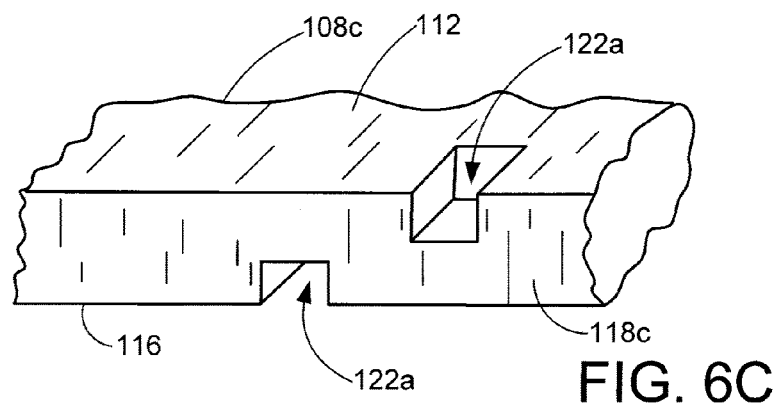
Figure 6D:
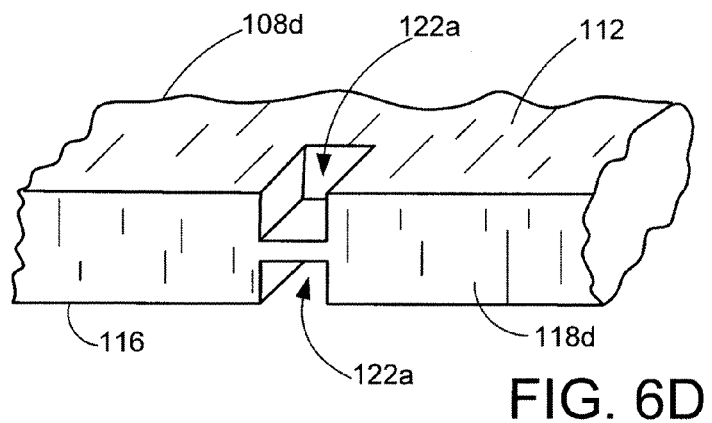

FIG. 6C shows that one or more adhesive receptacle 122a may be formed so as to intersect with both the perimeter surface 118c of an overmolded first actuator/coil assembly part 108c and its first major surface 112 (e.g., a top surface), and that one or more adhesive receptacles 122a may be formed so as to intersect with both the perimeter surface 118c and the second major surface 116 (e.g., its bottom surface) of the part 108c. The adhesive receptacle 122a that is associated with the first major surface 112 in FIG. 6C is at least somewhat offset in relation to the adhesive receptacle 122a that is associated with the second major surface 116 in FIG. 6C. FIG. 6D shows that one or more adhesive receptacles 122a may be formed so as to intersect with both the perimeter surface 118d of an overmolded first actuator/coil assembly part 108d and its first major surface 112 (e.g., a top surface), and that one or more adhesive receptacles 122a may be formed so as to intersect with both the perimeter surface 118d and the second major surface 116 (e.g., its bottom surface). The adhesive receptacle 122a that is associated with the first major surface 112 in FIG. 6D is aligned with the adhesive receptacle 122a that is associated with the second major surface 116 in FIG. 6D.

Figure 6E:
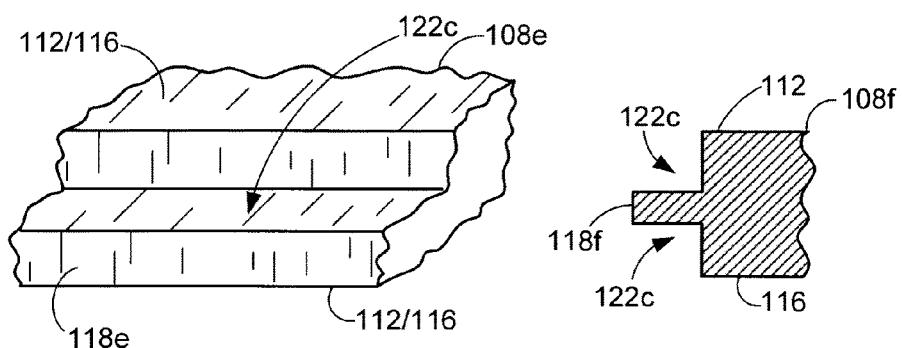

FIG. 6E shows an adhesive receptacle 122c that intersects with both the perimeter surface 118e, and either the first major surface 112 (e.g., the top surface) or the second major surface 116 (e.g., the bottom surface) of an overmolded first actuator/coil assembly part 108e. This adhesive receptacle 122c may extend along the entire length of the joint 132 between the overmolded first actuator/coil assembly part 108e and the second actuator/coil assembly part 124. That is, the adhesive receptacle 122c could be the form of a groove or the like that extends along the entire joint 132 between the overmolded first actuator/coil assembly part 108e and the second actuator/coil assembly part 124. In any case, the depth of the adhesive receptacle 122c is less than the thickness of the overmolded first actuator/coil assembly part 108e.

Figure 6F:
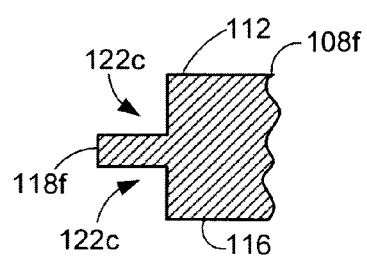

FIG. 6F shows one adhesive receptacle 122c that intersects with both the perimeter surface 118f and the first major surface 112 (e.g., the top surface) of an overmolded first actuator/coil assembly part 108f, and another adhesive receptacle 122c that intersects with both the perimeter surface 118f and the second major surface 116 (e.g., the bottom surface) of this overmolded first actuator/coil assembly part 108f. Each adhesive receptacle 122c may extend along the entire length of the joint 132 between the overmolded first actuator/coil assembly part 108f and the second actuator/coil assembly part 124. That is, each adhesive receptacle 122c may be the form of a groove or the like that extends along the entire joint 132 between the overmolded first actuator/coil assembly part 108f and the second actuator/coil assembly part 124. In any case, the depth of each adhesive receptacle 122c is less than the thickness of the overmolded first actuator/coil assembly part 108f.

Each of the embodiments discussed in relation to FIGS. 6A-F provide a predefined space for receipt of an adhesive that will adhere to both the overmolded first actuator/coil assembly part 108 and the second actuator/coil assembly part 124. Any appropriate adhesive may be used, and may be deposited in any such adhesive receptacle 122 in any appropriate manner. Both wicking and non-wicking adhesives may be utilized. One advantage of an adhesive that has a tendency to wick is that adhesive may flow into a space in the joint 132 that intersects with an adhesive receptacle 122 by a capillary or capillary-like action. This may further stiffen the interconnection of the overmolded first actuator/coil assembly part 108 to the second actuator/coil assembly part 124. UV-curable adhesives may be used, as well as thermally-cured adhesives.

Figure 7:
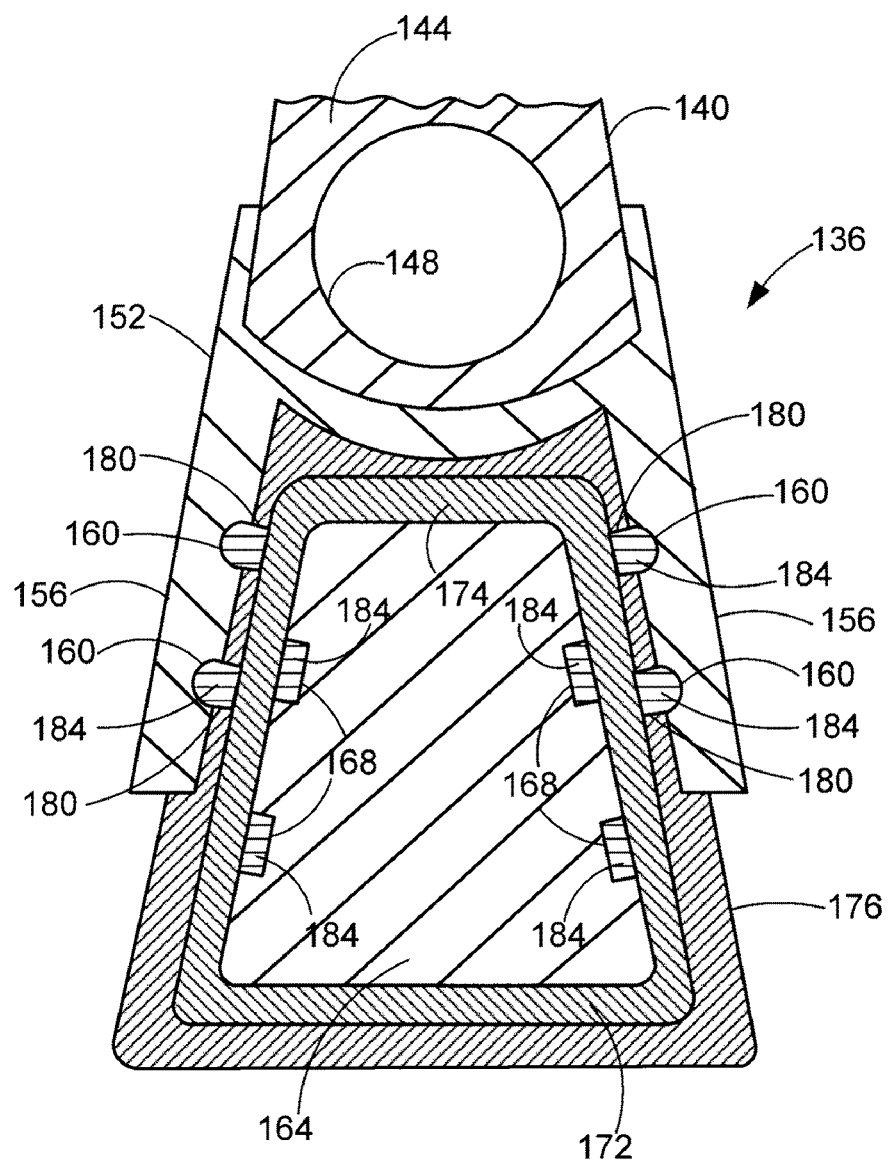
FIG. 7 is one embodiment of an actuator/coil assembly that uses both overmolding and adhesives to attach a coil to an actuator.

FIG. 7 illustrates one embodiment of an actuator/coil assembly that utilizes the multiple bonding techniques described above in relation to FIGS. 5-6F. The actuator/coil assembly 136 of FIG. 7 includes an actuator 140, which may be used in place of the actuator 27 discussed above in relation to the disk drive 10 of FIG. 1 or any other disk drive. The actuator 140 includes an actuator body 144 and a fan tail 152 that are appropriately fixed relative to each other (e.g., of one-piece construction; separate structures that are appropriately attached). The fan tail 152 may be of any appropriate configuration (e.g., it may be disposed about the entirety of coil 172). A pivot bearing aperture 148 extends at least partially through the actuator body 144 for receipt of a pivot bearing therein of the type discussed above in relation to the disk drive 10 of FIG. 1. One or more actuator arms or actuator arm tips of the type discussed above in relation to the disk drive 10 of FIG. 1 would also extend from the actuator body 144, typically in a direction that is opposite that which the fan tail 152 extends from the actuator body 144. The actuator 140 overall may be of any appropriate configuration.

Another component of the actuator/coil assembly 136 is a bobbin 164. As will be discussed in more detail below, the bobbin 164 is defined by an overmolding operation that not only forms the bobbin 164, but also attaches the bobbin 164 to a coil 172 of the actuator/coil assembly 136. One or more adhesive receptacles 168 are also formed on a perimeter of the bobbin 164 by the overmolding operation. The discussion of the adhesive receptacles 122, and 122a-c of FIGS. 5 and 6A-F is applicable to the adhesive receptacles 168 for the bobbin 164. Therefore, the discussion presented above regarding the overmolded first actuator/coil assembly part 108 is applicable to the bobbin 164 as well. The bobbin 164 may be of any appropriate configuration, and may include one or more cutouts for weight reduction purposes or otherwise (not shown).

The above-noted coil 172 of the actuator/coil assembly 136 is annular, and is thereby disposed about the entire perimeter of the bobbin 164 in the illustrated embodiment. The coil 172 includes a plurality of conductive wires (e.g., copper) that form a continuous loop. Any configuration may be utilized by the coil 172 that is appropriate for use in a voice coil motor of a disk drive. The bobbin 164 is attached to an inner perimeter of the coil 172 by the overmolding operation as noted. As noted above, the discussion presented above regarding the overmolded first actuator/coil assembly part 108 is applicable to the bobbin 164. Similarly, the discussion presented above regarding the second actuator/coil assembly part 124 is applicable to the coil 172. That is, each adhesive receptacle 168 on the outer perimeter of the bobbin 164 also interfaces with the inner perimeter of the coil 172 as well. Therefore, adhesive 184 that is disposed within the adhesive receptacles 168 attaches to both the bobbin 164 and the coil 172. Use of two, separate and distinct bonding techniques (overmolding and adhesives) increases the stiffness of the interconnection of the bobbin 164 to the coil 172.

A first overmolded part 176 is disposed the between and interconnects the coil 172 and the fan tail 152 of the actuator 140. In the illustrated embodiment, the first overmolded part 176 is disposed about the entire outer perimeter of the coil 172, but may be of any appropriate configuration. The first overmolded part 176 may also be disposed over a portion of the top and/or bottom surface of the coil 172 (e.g., the first overmolded part 176 may extend over all or a portion of a segment 174 of the coil 172). Other configurations may be appropriate for the first overmolded part 176. What is important in relation to the first overmolded part 176 for purposes of the present invention is that it attaches the coil 172 to the fan tail 152 through the overmolding operation.

The first overmolded part 176 is formed by the same overmolding operation that defines the bobbin 164. Portions of the overmolded part 176 that interface with the fan tail 152 become attached to the fan tail 152 by the overmolding operation. Portions of the overmolded part 176 that interface with the coil 172 become attached to the coil 172 by the overmolding operation as well. A plurality of adhesive receptacles 180 are also formed in the first overmolded part 176 by the overmolding operation. The discussion of the adhesive receptacles 122, and 122a-c of FIGS. 5 and 6A-F is applicable to the adhesive receptacles 180 for the first overmolded part 176. Therefore, the discussion presented above regarding the overmolded first actuator/coil assembly part 108 is applicable to the first overmolded part 176 as well.

In the illustrated embodiment, each adhesive receptacle 180 intersects with both the outer perimeter of the coil 172 and an inner perimeter surface of a corresponding leg 156 of the fan tail 152. One or more recesses 160 may be formed on the inner perimeter surface of the legs 156 of the fan tail 152 to at least potentially enhance the stiffness of the interconnection between the first overmolded part 176 and the fan tail 152. Each recess 160 on each leg 156 intersects with an adhesive receptacle 180 formed on the first overmolded part 176. There may be a situation where it would be desirable to have one or more adhesive receptacles 180 only for the intersection of the first overmolded part 176 and the coil 172 (i.e., that do not intersect with the fan tail 152), and to have one or more separate adhesive receptacles 180 only for the intersection of the first overmolded part 176 and the fan tail 152 (i.e., that do not intersect with the coil 172) (not shown).

The discussion presented above regarding the overmolded first actuator/coil assembly part 108 is applicable to the first overmolded part 176. Similarly, the discussion presented above regarding the second actuator/coil assembly part 124 is applicable to both the coil 172 and the fan tail 152 (or more generally the actuator 140). That is, each adhesive receptacle 180 on the first overmolded part 176 that intersects with a perimeter of the first overmolded part 176 also interfaces with the outer perimeter of the coil 172 and a perimeter of the fan tail 152. Therefore, adhesive 184 that is disposed within the adhesive receptacles 180 attaches to the coil 172, the first overmolded part 176, and the fan tail 152 of the actuator 140. Use of these two, separate and distinct bonding techniques (overmolding and an adhesive) increases the stiffness of the interconnection of the coil 172 to the fan tail 152.

Two separate and distinct bonding operations interconnect the coil 172 with the actuator 140 in the case of the actuator/coil assembly 136 of FIG. 7. One bonding or attachment operation is the noted overmolding operation. The actuator 140 and the coil 172 may be disposed within an appropriate mold that disposes the coil 172 in the desired position relative to the actuator 140. An appropriate overmolding resin may then be injected into this mold to simultaneously form the bobbin 164, the adhesive receptacles 168 on the outer perimeter of the bobbin 164, the first overmolded part 176, and the adhesive receptacles 180 associated with the first overmolded part 176. Once this resin has cured an appropriate amount, the actuator/coil assembly 136 may be removed from the mold as a single unit. That is, the overmolding operation attaches the bobbin 164 to the coil 172, attaches the first overmolded part 176 to the coil 172, and attaches the first molded part 176 to the fan tail 152 of the actuator 140. Therefore, the coil 172 is structurally interconnected with the actuator 140 in and of itself by the overmolding operation.

Adhesive 184 may be disposed within each adhesive receptacle 168 to increase the stiffness of the interconnection of the bobbin 164 to the coil 172. That is, adhesive 184 in each adhesive receptacle 168 bonds to both the bobbin 164 and the coil 172. Similarly, adhesive 184 may be disposed within each adhesive receptacle 180 to increase the stiffness of the interconnection of the first overmolded part 176 to the coil 172, and to increase the stiffness of the interconnection of the first overmolded part 176 to the fan tail 152 of the actuator 140. That is, adhesive 184 in each adhesive receptacle 180 bonds to each of the coil 172, the first overmolded part 176, and the fan tail 152 of the actuator 140. As noted, separate adhesive receptacles 180 could be provided for the interconnection of the first overmolded part 176 to the coil 172, and for the interconnection of the first overmolded part 176 to the fan tail 152 of the actuator 140 (not shown).

Any way of providing adhesive 184 to the adhesive receptacles 168, 180 may be utilized. Typically the adhesive 184 will be disposed within the adhesive receptacles 168, 180 after the actuator/coil assembly 136 has been removed from the mold as a single unit, but this is not a requirement. It should be appreciated that the attachment of the bobbin 164 to the coil 172, the attachment of the first overmolded part 176 to the coil 172, and the attachment of the first overmolded part 176 to the fan tail 152 of the actuator 140 by the overmolding operation alleviates the need for fixtures to maintain the coil 172 in a predetermined position relative to the actuator 140 during the application of adhesives 184. That is, the overmolding operation establishes and maintains the desired predetermined position between the coil 172 and the actuator 140 for the application of adhesive 184 into each of the adhesive receptacles 168, 180.

There are a number of variations of the attachment technique used by the actuator/coil assembly 136 of FIG. 7. It appears that the stiffness of the interconnection of the coil 172 to the actuator 140 is enhanced more by the adhesive receptacles 168 associated with the bobbin 164, than by the adhesive receptacles 180 associated with the first overmolded part 176. That is, the overmolding of the bobbin 164 to the coil 172, along with the subsequent disposition of adhesive 184 in the adhesive receptacles 168, increases the stiffness of the actuator/coil assembly 136 more than the overmolding of the first overmolded part 176 to both the and coil 172 and the fan tail 152 of the actuator 140, along with the subsequent disposition of adhesive 184 in the adhesive receptacles 180. Therefore, one variation would be to continue to form the bobbin 164 and its corresponding adhesive receptacles 168 by the overmolding operation. This same overmolding operation could still form the first overmolded part 176, but without the adhesive receptacles 180 (not shown). Therefore, the first overmolded part 176 would be attached to each of the coil 172 and the fan tail 152 of the actuator 140 only by the overmolding operation.

Figure 8:
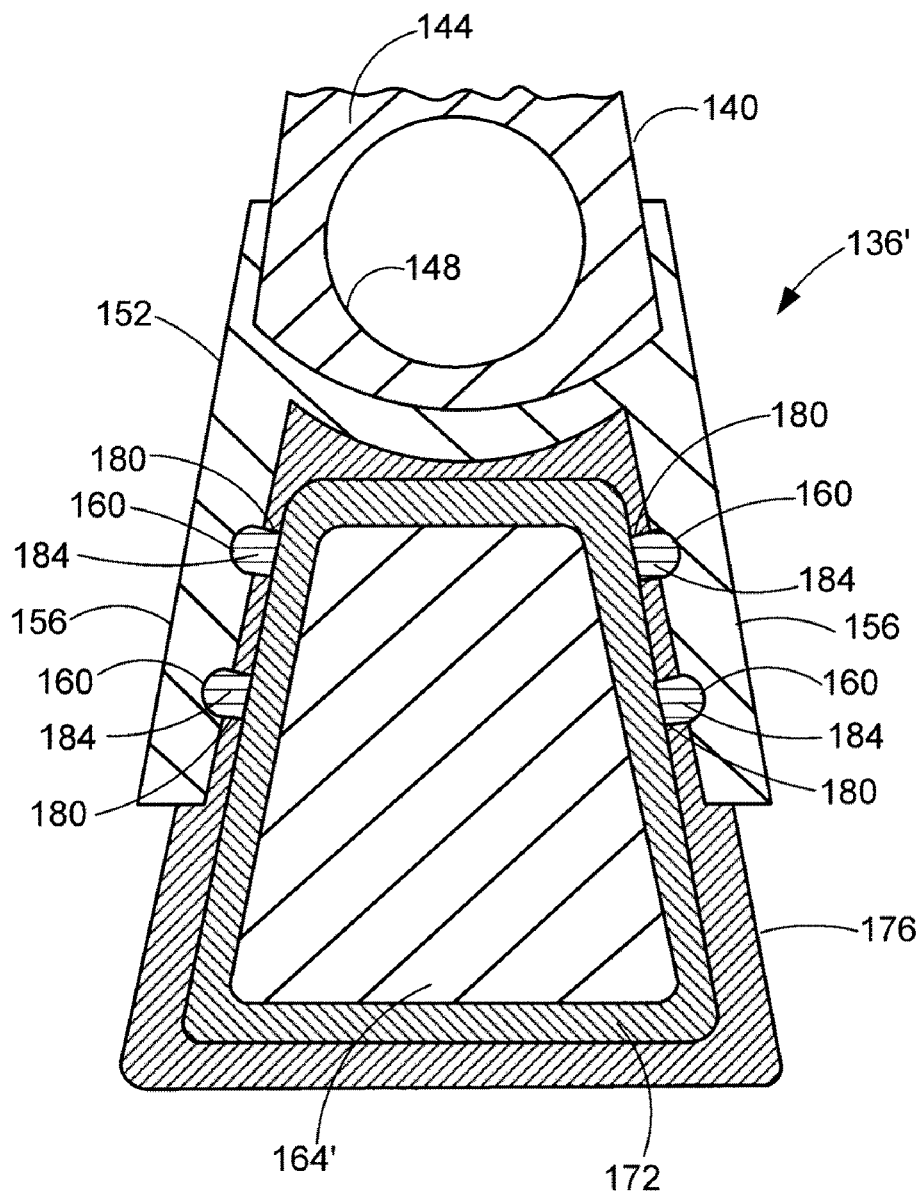
FIG. 8 is another embodiment of an actuator/coil assembly that uses both overmolding and adhesives to attach a coil to an actuator.

Another variation of the attachment technique used by the actuator/coil assembly 136 of FIG. 7 is illustrated in FIG. 8. Common components/assemblies between the embodiments of FIGS. 7 and 8 are identified by the same reference numeral. A "single prime" designation is used to identify those components/assemblies that differ in at least some respect. There is only one difference between the actuator/coil assembly 136 of FIG. 7 and the actuator/coil assembly 136' of FIG. 8. The bobbin 164' is attached to the coil 172 prior to the overmolding operation in the case of the FIG. 8 embodiment. That is, the bobbin 164' is not formed by an overmolding operation in the case of the actuator assembly 136' of FIG. 8. Therefore, the bobbin 164' does not attach to the coil 172 by the overmolding operation in the case of the actuator/coil assembly 136'.

In one embodiment, the bobbin 164' is press fit within the opening in the annular coil 172 prior to being positioned in the mold along with the actuator 140 for the overmolding operation that attaches the coil 172 to the fan tail 152 of the actuator 140 in the case of the actuator/coil assembly 136' of FIG. 8. Any way of attaching the bobbin 164' to the coil 172 prior to the overmolding operation could be utilized. In any case, the overmolding operation would thereafter define the first overmolded part 176 and its adhesive receptacles 180. The overmolding operation would then first attach the first overmolded part 176 to both the coil 172 and the fan tail 152 of the actuator 140. The adhesive receptacles 180 formed in the first overmolded part 176 by the overmolding operation could then be used to subsequently apply an adhesive 184 within the adhesive receptacles 180 for enhancing the stiffness of the interconnection of the coil 172 to the actuator 140.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A method comprising the steps of:
    overmolding a coil to an actuator to attach said coil to said actuator via an intervening overmold material, wherein the overmold material has at least one localized area of reduced thickness along a joint connecting the coil to the actuator; and
    disposing an adhesive in at least one adhesive receptacle defined in the overmold material so that the adhesive contactingly engages the coil and the actuator to increase a vibrational stiffness response of the actuator and the coil, wherein said disposing step is executed after said overmolding step and wherein the adhesive is disposed only in the at least one adhesive receptacle.

2. A method, as claimed in claim 1, wherein:
    said overmolding step comprises forming a first overmolded part that is attached to each of said actuator and said coil by said overmolding step.

3. A method, as claimed in claim 2, wherein:
    said overmolding step further comprises forming a bobbin from an additional amount of the overmold material that is attached to said coil by said overmolding step, wherein said coil is disposed about at least part of said bobbin.

4. A method, as claimed in claim 1, wherein:
said overmolding step comprises forming a first overmolded part and providing a first stiffness for an interconnection of said first overmolded part to at least one of said actuator and said coil, and wherein said disposing step comprises providing a second stiffness for said interconnection, wherein said second stiffness is greater than said first stiffness.

5. A method, as claimed in claim 1, wherein:
said overmolding step comprises disposing said coil and said actuator in a mold, wherein said method further comprises the step of removing said actuator from said mold after said overmolding step and thereby with said coil being attached to said actuator, and wherein said disposing step is executed after said removing step.

6. A method, as claimed in claim 5, wherein:
said disposing step is executed without any fixtures to retain said coil in a predetermined position relative to said actuator.

7. A method, as claimed in claim 1, wherein:
said overmolding step comprises forming a first overmolded part and forming a first adhesive receptacle in said first overmolded part.

8. A method, as claimed in claim 7, wherein:
said first overmolded part structurally joins said actuator with said coil by an annular overmolding region and at least one adhesive attachment region, wherein the overmolding region and the adhesive attachment region comprise a thickness of the coil.

9. A method, as claimed in claim 8, wherein:
said forming a first adhesive receptacle step comprises disposing said first adhesive receptacle on a perimeter of said first overmolded part.

10. A method, as claimed in claim 7, wherein:
said coil comprises a coil opening, wherein said first overmolded part is disposed within said coil opening and is attached to said coil.

11. A method, as claimed in claim 10, wherein:
said adhesive within said first adhesive receptacle attaches to both said first overmolded part and said coil.

12. A method, as claimed in claim 1, wherein:
said overmolding step comprises forming a first overmolded part, forming at least one said adhesive receptacle in said first overmolded part, forming a second overmolded part, and forming at least one said adhesive receptacle in said second overmolded part, wherein said first overmolded part is disposed between and is attached to each of said actuator and said coil by said overmolding step, wherein said coil is disposed about at least part of said second overmolded part and is attached to said second overmolded part by said overmolding step, wherein said adhesive in at least one said adhesive receptacle is attached to at least said actuator and said first overmolded part, wherein said adhesive in at least one said adhesive receptacle is attached to at least said first overmolded part and said coil, and wherein said adhesive in at least one said adhesive receptacle is attached to both said coil and said second overmolded part.

13. A method, as claimed in claim 1, further comprising the step of:
wicking said adhesive into a space after said disposing step.

14. A method comprising the steps of:
disposing a coil and an actuator in a mold;
executing a first molding step comprising molding a first molded part that structurally joins said coil to said actuator, wherein said first molding step is executed within said mold;
executing a second molding step comprising molding a bobbin that structurally joins said coil to said bobbin, wherein said coil is disposed about at least part of said bobbin, and wherein said second molding step is also executed within said mold;
forming at least one adhesive receptacle in at least one of said first molded part or said bobbin during at least one of said first and second molding steps wherein a molding material has at least one localized area of reduced thickness along a joint connecting the coil to the actuator and a joint connecting the bobbin to the coil;
removing said actuator, said first molded part, said coil, and said bobbin from said mold as a single unit after completion of said first and second molding steps; and
disposing an adhesive in said at least one adhesive receptacle after said removing step to further adjoin the bobbin to the coil or the first molded part to the actuator to increase a vibrational stiffness of said single unit, wherein the adhesive is disposed only in the at least one adhesive receptacle.

15. A method, as claimed in claim 14, wherein:
said first and second molding steps are executed simultaneously.

16. A method, as claimed in claim 14, wherein:
said first and second molding steps each comprise overmolding.

17. A method, as claimed in claim 14, wherein:
said disposing step comprises increasing a stiffness of at least one of first and second interconnections, wherein said first interconnection is between said actuator and said coil, and wherein said second interconnection is between said coil and said bobbin.

18. A method, as claimed in claim 14, wherein:
said disposing step is executed without any fixtures to retain said coil in a predetermined position relative to said actuator.

19. A method, as claimed in claim 14, wherein:
said forming at least one adhesive receptacle step comprises a first adhesive receptacle that intersects with a joint defined in part by one of said first molded part and said bobbin.

20. A method, as claimed in claim 19, wherein:
said first adhesive receptacle intersects with a joint between said first molded part and said actuator.

21. A method, as claimed in claim 19, wherein:
said first adhesive receptacle intersects with a joint between said first molded part and said coil.

22. A method, as claimed in claim 19, wherein:
said first adhesive receptacle intersects with a joint between said first molded part and said actuator, as well as with a joint between said first molded part and said coil.

23. A method, as claimed in claim 19, wherein:
said first adhesive receptacle intersects with a joint between said bobbin and said coil.

24. A method, as claimed in claim 14, wherein:
said forming at least one adhesive receptacle step comprises forming a plurality of said adhesive receptacles, wherein said adhesive in at least one said adhesive receptacle is attached to at least said actuator and said first overmolded part, wherein said adhesive in at least one said adhesive receptacle is attached to at least said first overmolded part and said coil, and wherein said adhesive in at least one said adhesive receptacle is attached to both said coil and said bobbin.

25. A method, as claimed in claim 14, wherein:
said forming at least one adhesive receptacle step comprises a first adhesive receptacle that intersects with a first joint between said actuator and said first molded part, as well as with a second joint between said first molded part and said coil, and wherein said forming at least one adhesive receptacle step further comprises forming a second adhesive receptacle that intersects with a second joint between said bobbin and said coil.

26. A method comprising the steps of:
employing an initial overmolding operation to attach a coil to an actuator via an overmolding material while forming at least one adhesive receptacle in said material, wherein the overmold material has at least one localized area of reduced thickness along a joint connecting the coil to the actuator; and
subsequently filling the at least one adhesive receptacle with an adhesive to further attach said coil to said actuator and increase a vibrational stiffness response associated with the actuator, wherein the adhesive contactingly engages the coil and the actuator and wherein the adhesive is disposed only in the at least one adhesive receptacle.

27. A method, as claimed in claim 26, wherein:
the employing step comprises providing a first stiffness for an interconnection of said actuator to said coil, and wherein the subsequently filling step comprises providing a second stiffness for said interconnection of said actuator to said coil, wherein said second stiffness is greater than said first stiffness.

28. A method, as claimed in claim 26, wherein:
the subsequently filling step comprises flowing the adhesive into a notch in the actuator which communicates with the at least one adhesive receptacle.

29. A method, as claimed in claim 28, wherein:
said overmolding operation comprises forming a first overmolded part that is attached to each of said actuator and said coil.

30. A method, as claimed in claim 29 wherein: said overmolded operation comprises forming the at least one adhesive receptacle in said first overmolded part.

31. A method, as claimed in claim 30, wherein:
the employing step comprises forming a plurality of discrete adhesive receptacles in the overmold material, and wherein the subsequently filling step comprises filling each of the plurality of discrete adhesive receptacles with a separate volume of adhesive that respectively contactingly engages the coil and the actuator and does not contactingly engage any other said separate volume of adhesive.

32. A method, as claimed in claim 30, wherein:
the employing step further comprises employing the initial overmolding operation to additionally form a coil bobbin within and directly attached to an interior circumferential extent of the coil from an additional volume of said overmolding material, said overmolded coil bobbin comprising a second adhesive receptacle; and
the subsequently filling step further comprises filling the second adhesive receptacle with an additional volume of said adhesive to further attach the coil bobbin to the coil.

33. A method comprising the steps of:
employing an initial overmolding operation to attach a voice motor coil to a bobbin via an overmolding material while forming at least one adhesive receptacle in said material, wherein the overmold material has at least one localized area of reduced thickness along a joint connecting the coil to the bobbin; and
subsequently filling the at least one adhesive receptacle with an adhesive to further attach said bobbin to said coil and increase a vibrational stiffness response associated with the bobbin, wherein the adhesive contactingly engages the coil and the bobbin and wherein the adhesive is disposed only in the at least one adhesive receptacle.

34. A method, as claimed in claim 33, wherein:
the employing step comprises forming a plurality of discrete adhesive receptacles in the overmold material, and wherein the subsequently filling step comprises filling each of the plurality of discrete adhesive receptacles with a separate volume of adhesive that respectively contactingly engages the coil and the bobbin and does not contactingly engage any other said separate volume of adhesive.

35. A method, as claimed in claim 33, wherein:
the employing step further comprises employing the initial overmolding operation to additionally attach the coil to an actuator using an additional volume of said overmolding material, said additional volume of said overmolding material comprising a second adhesive receptacle; and
the subsequently filling step further comprises filling the second adhesive receptacle with an additional volume of said adhesive to further attach the coil bobbin to the coil.

* * * * *

UNITED STATES PATENT AND TRADEMARK OFFICE
CERTIFICATE OF CORRECTION

PATENT NO.      : 7,597,833 B1                    Page 1 of 1
APPLICATION NO. : 10/791150
DATED           : October 6, 2009
INVENTOR(S)     : Brause et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 374 days.

Signed and Sealed this

Twenty-eighth Day of September, 2010

David J. Kappos
*Director of the United States Patent and Trademark Office*